UNITED STATES PATENT OFFICE

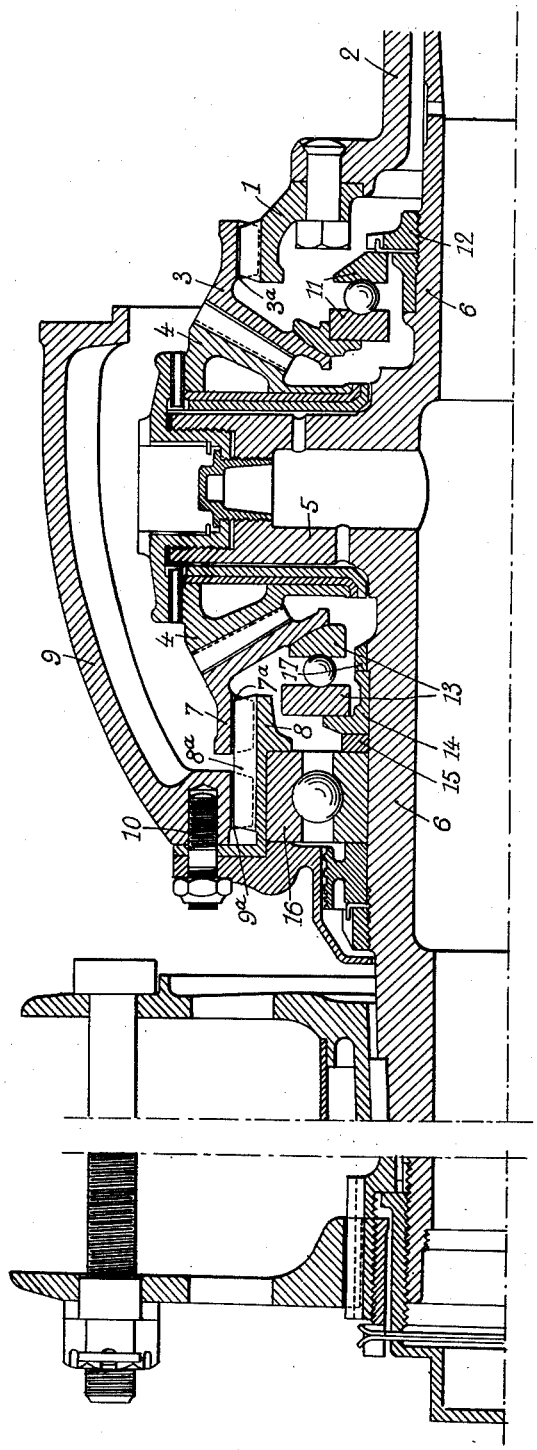

CHARLES RAYMOND WASEIGE, OF RUEIL, FRANCE, ASSIGNOR TO ECLIPSE AVIATION CORPORATION, OF EAST ORANGE, NEW JERSEY, A CORPORATION OF NEW JERSEY

DRIVE TRANSMISSION GEAR OF THE BEVEL DIFFERENTIAL TYPE

Application filed June 13, 1930, Serial No. 460,980, and in France July 1, 1929.

In drive transmission gears of the bevel differential type, and especially in such speed reduction gears used for aeroplane propellers where the main shaft drives a rotary sun wheel meshing with planetary pinions mounted loose on bearer arms solid with the propeller shaft and rolling on a nonrotary sun wheel attached to the casing, the thrust from the planetary pinions against the nonrotary sun wheel is taken by the casing, through a swivel thrust bearing which renders possible radial displacements of the nonrotary sun wheel and oscillation of the pitch circle thereof. On the other hand, tensile strain or axial thrust received from the propeller by the propeller shaft and subsequently by the planetary pinions which must follow the shaft in all its displacements is taken by the casing, through a thrust block independent of that first mentioned. This results in the tensile strain or thrust from the propeller being delivered to the nonrotary sun wheel through the planetary pinions. When, on account of wear, the propeller shaft thrust bearing develops a certain amount of play, a condition arises which is liable to cause tooth breaking.

The object of this invention is to escape this inconvenience, and with this aim in view said nonrotary sun wheel is made movable axially in relation to the casing, and its axial abutment is so designed that the said nonrotary sun wheel itself will take part in the longitudinal displacements of the planet carrying shaft.

The accompanying drawing shows solely by way of example, a longitudinal section of a speed reduction gear of the bevel epicyclic type, improved according to this invention.

As shown on the construction illustrated in this drawing, the reduction gear consists, in the known manner, of a ring 1 externally provided with flutes and fitted on to main shaft 2 whereby it is driven. A bevel sun wheel 3 is arranged to rotate with shaft 2 through flutes $3^a$.

Bevel sun wheel 3 meshes with planetary bevel pinions 4 mounted loose on arms 5 carried by propeller shaft 6. Planetary pinions 4 run also on a toothed sun wheel 7 prevented from rotating by flutes $7^a$ in engagement with flutes $8^a$ extended from a ring 8 secured to casing 9 by bolts 10, ring 8 being itself locked against rotation by engagement of its flute $8^a$ with those $9^a$ on the casing. Propeller shaft 6 is maintained centered inside driving shaft 2 at one end, and at the other by thrust race 16 fitted inside the fluted ring 8, secured to casing 9. Rotary sun wheel 3 presses against a thrust bearing 11 which takes the longitudinal strain from propeller shaft 6 through a threaded ring 12 screwed over said shaft.

According to the invention, swivel thrust bearing 13 presses through its plane rolling track against a shoulder provided on ring 14 mounted on shaft 6, said ring being abutted against thrust race 16 through the medium of washer 15, and direct against nonrotary sun wheel 7 through its other rolling track provided outside with a spherical face.

The system is operated as follows: rotation of main shaft 2 drives fluted ring 1 which actuates toothed sun wheel 3 meshing with planetary pinions 4; the latter are then caused to roll on nonrotary toothed sun wheel 7.

It will be seen that, owing to the improvement, the subject matter of this invention, the respective position of shaft 6, ring 14, thrust bearing 13, toothed sun wheel 7, is in no way affected in relation to planetary pinions 4 by the wear or displacement of thrust race 16. It will be seen that through swivel thrust 13, constant meshing is realized with slight flotation, of sun wheel 7 with the planetary pinions 4, without any possibility of their being put out of order.

This arrangement enjoys the further advantage, when fitting or overhauling, to facilitate adjustment of the clearances required to obtain proper meshing. Such adjustment remains absolutely independent of the racing clearance of propeller thrust 16. It goes without saying that this invention is in no way limited to the construction shown, which is given solely by way of example.

Having now described my invention, what I claim as new and desire to secure by Letters Patent is:

1. In combination with a driving shaft and a driven shaft, an epicyclic gearing comprising a rotary bevel sun wheel adapted to be driven by said driving shaft, a casing for said gearing, a non-rotary bevel sun wheel displaceable axially to a limited extent, a torque reacting connection between said casing and said non-rotary sun wheel, planetary pinions carried by and locked axially with said driven shaft, and an axial abutment for said non-rotary sun wheel, adapted to transmit all the axial thrust of said non-rotary sun wheel to said driven shaft, said axial abutment including a member having a substantially spherical surface and cooperating with a mating surface on said non-rotary sun wheel.

2. In a speed reducing gear for aircraft propellers, a driving shaft, a propeller shaft alined therewith, an epicyclic gearing comprising a rotary bevel sun wheel adapted to be driven by said driving shaft, a non-rotary bevel sun wheel, planetary pinions rotatably supported by said propeller-shaft, an anti-friction thrust bearing for said propeller-shaft, said thrust bearing having at least one free rolling race, and means abutting said race of said thrust bearing for absorbing the axial thrust of said non-rotary bevel sun wheel.

3. In combination with alined driving and driven shafts, a gear casing, an epicyclic gearing comprising a rotary bevel sun wheel, a torque transmitting connection between said driving shaft and said sun wheel, a non-rotary axially movable bevel sun wheel, a torque reacting connection between said casing and said non-rotary sun wheel, planetary pinions rotatably supported by and locked axially with said driven shaft, and a plurality of axial abutments, one for said rotary sun wheel and another for said non-rotary sun wheel, said abutments being adapted to transmit the thrust of said sun wheels to said driven shaft, and means between said casing and said driven shaft for absorbing the thrust of said driven shaft.

4. In combination with alined driving and driven shafts, an epicyclic gearing comprising a rotary bevel sun wheel adapted to be driven by said driving shaft, a non-rotary bevel sun wheel, planetary pinions adapted to mesh with both said bevel sun wheels, bearing means rotatable with the driven shaft for supporting said planets, means spaced from said driven shaft for absorbing the axial thrust of said driven shaft, and means whereby axial displacements of the driven shaft in response to the wear of said thrust absorbing means will not affect the meshing relation of both sun wheels with said planets, said means including cooperating substantially spherical bearing surfaces on the driven shaft and the sun wheels, respectively.

5. In a speed reducing gear for aircraft propellers, a driving shaft, a propeller shaft alined therewith, an epicyclic gearing comprising a rotary bevel sun wheel adapted to be driven by said driving shaft, a non-rotary bevel sun wheel, planetary pinions rotatably supported by said propeller shaft, an anti-friction thrust bearing for said propeller shaft, and means embodying a second thrust bearing interposed between said non-rotary sun wheel and one race of said bearing for transmitting the thrust of said non-rotary sun wheel to said propeller shaft.

6. A speed reducing gear as claimed in claim 5, wherein said second thrust bearing consists of a ball thrust bearing spaced from and surrounding said driven shaft and having a spherical bearing surface engaging a mating surface of said non-rotary sun wheel which is further floatingly supported by said planetary pinions.

7. In a speed reducing gear for aircraft propellers a driving shaft, a propeller shaft alined therewith, an epicyclic gearing comprising a rotary bevel sun wheel adapted to be drivingly connected with said driving shaft, a non-rotary bevel sun wheel, planetary pinions rotatably supported by said propeller shaft, and an axial abutment between said propeller shaft and said non-rotary sun wheel, said abutment including a thrust anti-friction bearing.

8. In a speed reducing gear for aircraft propellers, a driving shaft, a propeller shaft alined therewith, a gear casing, an epicyclic gearing comprising a rotary bevel sun wheel adapted to be drivingly connected with said driving shaft, a non-rotary bevel sun wheel, planetary pinions rotatably supported by said propeller shaft, a thrust bearing for said propeller shaft adapted to resist the thrust of the propeller shaft, and embodying a member locked with said casing and a member locked with said propeller shaft, and means, including spherical bearing surfaces, interposed between said non-rotary sun wheel and said last named member.

9. In a speed reducing mechanism embodying a conical epicyclic train between a driving shaft and a driven shaft, a sun wheel having a spherical surface, a ring having a mating spherical surface and a plane surface perpendicular to the axis of the driven shaft, said ring being spaced from and surrounding the driven shaft and being centered only by the engagement of its spherical surface with the corresponding surface of said sun wheel, and a thrust block locked with said shaft and having a plane surface perpendicular to the axis of said shaft, said ring being adapted to bear through its plane surface against the plane surface of said thrust block.

10. In a speed reducing mechanism embodying a conical epicyclic train between two shafts, a floatingly mounted non-rotary sun wheel and thrust absorbing means between said sun wheel and one of said shafts for locking said sun wheel axially, said thrust absorbing means being adapted to prevent displacement of said sun wheel in an axial direction but in no other.

11. In a speed reducing mechanism embodying a conical epicyclic train between two shafts, a floatingly mounted non-rotary sun wheel, thrust absorbing means for said sun wheel comprising a ball and socket joint, and means locked with one of said shafts for connecting the latter with said thrust absorbing means and adapted to allow radial displacement of the center of said ball and socket joint.

In testimony whereof I have signed my name to this specification.

CHARLES RAYMOND WASEIGE.